US007315863B2

(12) United States Patent
Kambo et al.

(10) Patent No.: US 7,315,863 B2
(45) Date of Patent: Jan. 1, 2008

(54) METHOD AND APPARATUS FOR AUTOMATIC NOTIFICATION OF DATABASE EVENTS

(75) Inventors: Rajit Kambo, San Mateo, CA (US); Namit Jain, Foster City, CA (US); Shailendra Mishra, Fremont, CA (US)

(73) Assignee: Oracle International Corp, Redwood Shores, CA (US)

( * ) Notice: Subject to any disclaimer, the term of this patent is extended or adjusted under 35 U.S.C. 154(b) by 318 days.

(21) Appl. No.: 09/957,736

(22) Filed: Sep. 20, 2001

(65) Prior Publication Data

US 2003/0055829 A1    Mar. 20, 2003

(51) Int. Cl.
*G06F 17/00* (2006.01)
(52) U.S. Cl. ...................... 707/101; 707/102
(58) Field of Classification Search ............ 707/3, 707/101–104.1, 1, 4, 10, 100; 714/39, 48; 705/5–6
See application file for complete search history.

(56) References Cited

U.S. PATENT DOCUMENTS

| 5,893,091 | A | * | 4/1999 | Hunt et al. ............ 707/3 |
| 6,192,407 | B1 | * | 2/2001 | Smith et al. ............ 709/229 |
| 6,275,957 | B1 | * | 8/2001 | Novik et al. ............ 714/39 |
| 6,381,610 | B1 | * | 4/2002 | Gundewar et al. ....... 707/104.1 |
| 6,401,074 | B1 | * | 6/2002 | Sleeper ............ 705/14 |
| 6,405,191 | B1 | | 6/2002 | Bhatt et al. |
| 6,502,093 | B1 | | 12/2002 | Bhatt et al. |
| 6,549,916 | B1 | | 4/2003 | Sedlar |

FOREIGN PATENT DOCUMENTS

| WO | WO 00/20386 | 4/2000 |
| WO | WO 01/08048 A1 | 2/2001 |

* cited by examiner

*Primary Examiner*—Sana Al-Hashemi
(74) *Attorney, Agent, or Firm*—Park, Vaughan & Fleming LLP

(57) ABSTRACT

One embodiment of the present invention provides a system that automatically sends a notification about a database event. The system operates by receiving a number of items, including a registration of a specified event-type, a subscription of a protocol for the notification, a format for the notification, and a list of recipients for the notification. The system then configures the database to send the notification about the specified event-type to the specified list of recipients in the specified format via the specified protocol. Adding this notification capability at the database-level enhances the functionality and interoperability of many applications as well as providing more robust and timely information to the appropriate audiences.

30 Claims, 4 Drawing Sheets

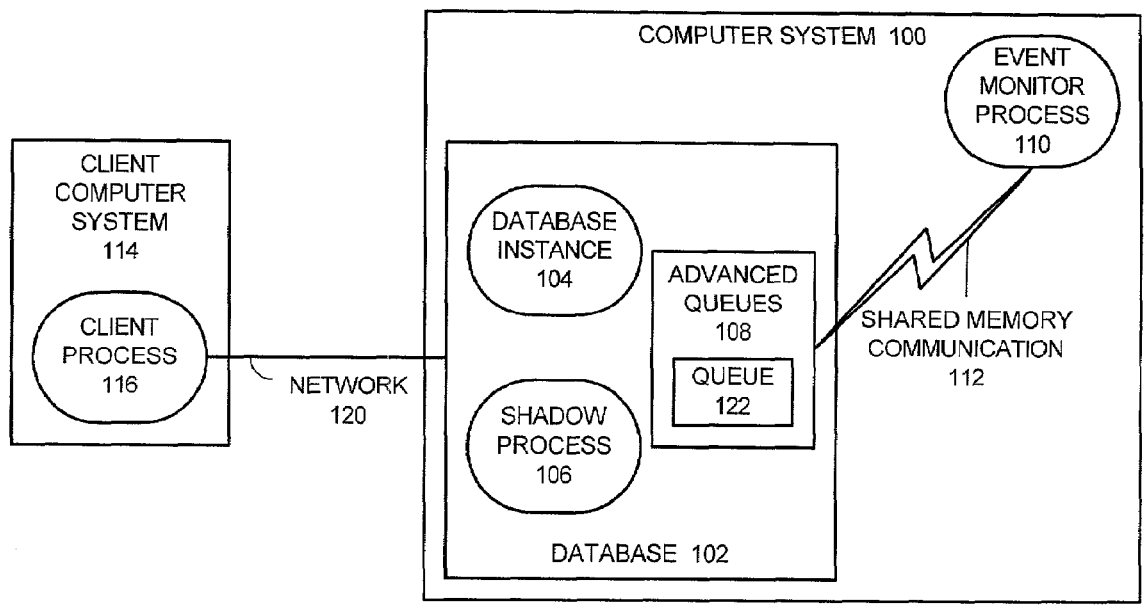
FIG. 1
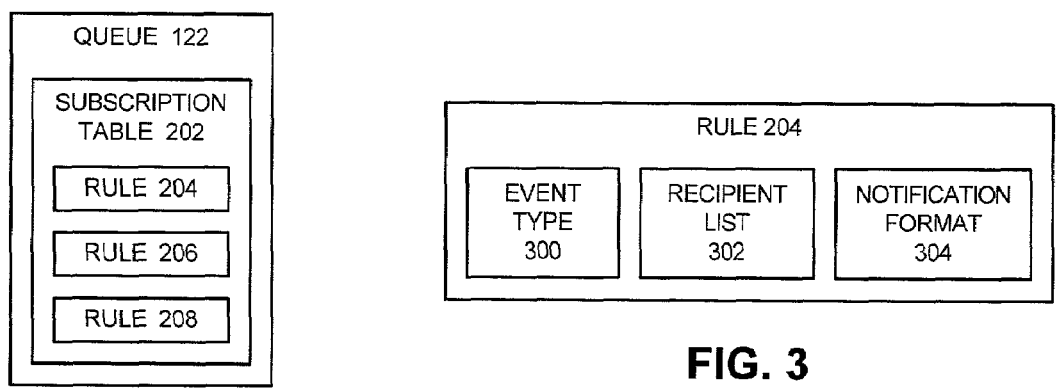
FIG. 2
FIG. 3

METHOD AND APPARATUS FOR AUTOMATIC NOTIFICATION OF DATABASE EVENTS

BACKGROUND

1. Field of the Invention

The present invention relates to computers and databases. More specifically, the present invention relates to a method and apparatus for automatically sending a notification about a database event in a specified format via a specified protocol to a specified list of recipients.

2. Related Art

The advent of e-commerce has led to the rapid development of web servers and database platforms. The number of new dynamic web applications continues to grow exponentially, and as a result, the underlying web servers and databases become increasingly complex with more and more functionality.

Currently, users of these databases write their applications to interact with the data stored in the database, but usually must rely on all transactions taking place within their application. The problem exists, however, that if the data is edited directly in the database, and thereby circumvents the application, some critical change might be missed by an interested party that the application was designed to notify. Note that this problem becomes increasingly more complex as multiple applications are written to interact with one common database. In addition, users and applications want to be notified of more and more database events as they happen.

Currently, the only methods of accomplishing this are through proprietary formats specified by the database provider, if they even exist at all. For instance, a technician might want to receive an email and a notification on his or her pager when the database server halts, or a manager might want a notification when the number of sales of a certain item surpasses the one-thousand mark.

What is needed in this situation is a method and an apparatus that generates and sends a notification to a list of clients in a specified presentation format via a specified protocol.

SUMMARY

One embodiment of the present invention provides a system that automatically sends a notification about a database event. The system operates by receiving a number of items, including a registration of a specified event-type, a subscription of a protocol for the notification, a format for the notification, and a list of recipients for the notification. The system then configures the database to send the notification about the specified event-type to the specified list of recipients in the specified format via the specified protocol. Adding this notification capability at the database-level enhances the functionality and interoperability of many applications as well as providing more robust and timely information to the appropriate audiences.

In one embodiment of the present invention, the system determines if the database event is of the specified event-type, and then sends the notification about the specified event-type to the specified list of recipients in the specified format via the specified protocol.

In one embodiment of the present invention, the system receives the event at a queue.

In one embodiment of the present invention, the system receives the event at a queue that is persistent.

In one embodiment of the present invention, the system receives the event at a queue that consists of records stored in a database table.

In one embodiment of the present invention, an event monitor determines if the event is of the specified event-type.

In one embodiment of the present invention, the notification is sent to multiple parties.

In one embodiment of the present invention, the event-types include: a client shutting down, a database shutting down, a stack overflowing, a trigger firing, a database record operation being performed, and a database error occurring.

In one embodiment of the present invention, the available protocols include Oracle Call Interface (OCI), Programming Language/SQL (PL/SQL), Simple Mail Transfer Protocol (SMTP), Hyper Text Transfer Protocol (HTTP), Wireless Application Protocol (WAP), and Simple Network Management Protocol (SNMP).

In one embodiment of the present invention, the available formats include Extensible Markup Language (XML), Hyper Text Markup Language (HTML), Wireless Markup Language (WML), Structured Query Language (SQL), and raw data.

In one embodiment of the present invention, the notification includes a command sent to a database to perform an action and a command sent to a computer to perform a task.

BRIEF DESCRIPTION OF THE FIGURES

FIG. 1 illustrates a computer system containing a database with the mechanism for the automatic notification of events in accordance with an embodiment of the present invention.

FIG. 2 illustrates a queue within the mechanism for automatic notification in accordance with an embodiment of the present invention.

FIG. 3 illustrates a rule within the queue in accordance with an embodiment of the present invention.

DETAILED DESCRIPTION

Figure 4:
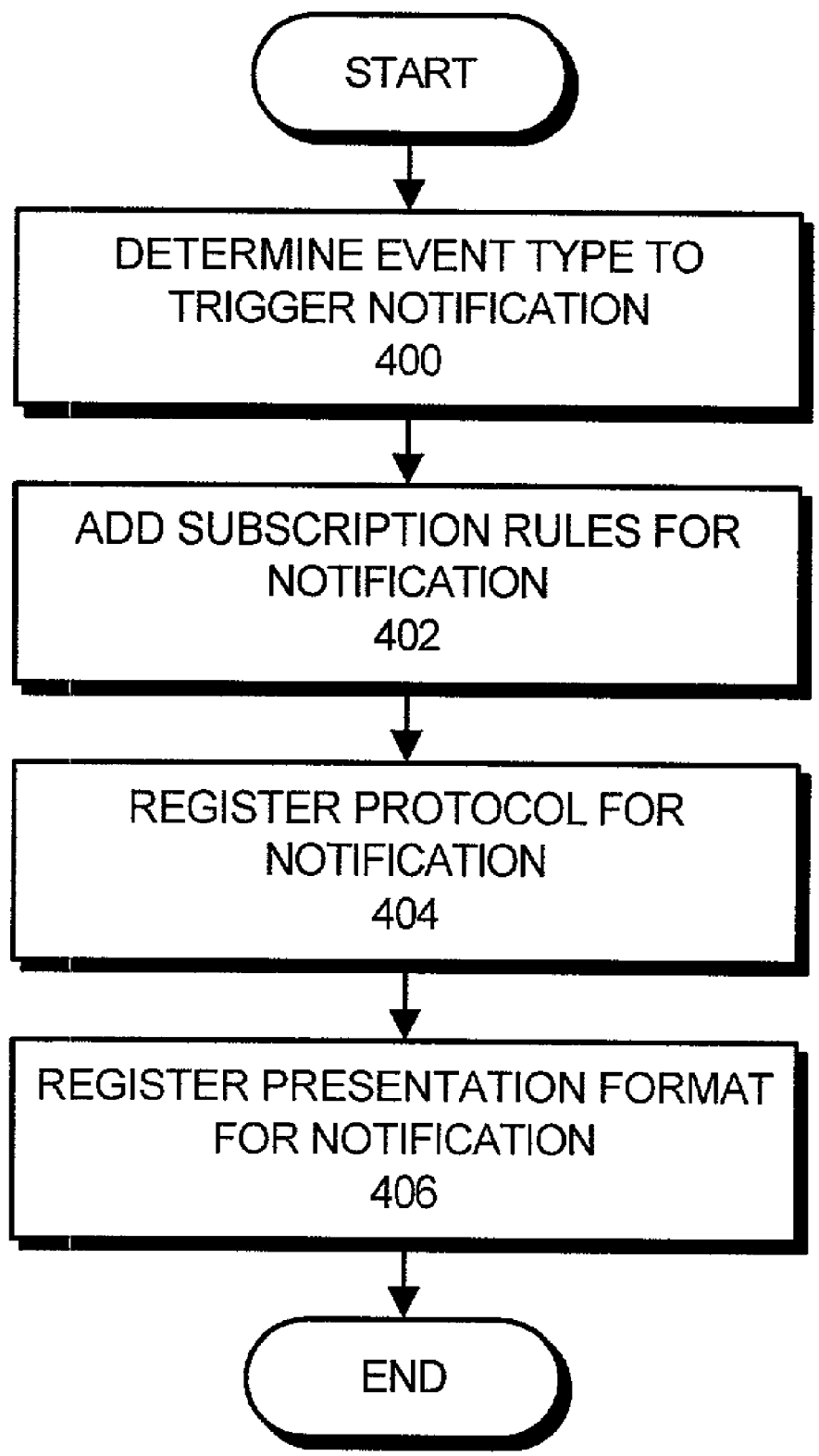
FIG. 4 is a flowchart illustrating the process of creating a registration of a specific event-type and a subscription for the notification of the event-type in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

FIG. 1 illustrates a computer system 100 containing a database 102 with a mechanism for the automatic notification of events in accordance with an embodiment of the present invention. The computer system 100 illustrated in FIG. 1 includes a database 102, which contains a database instance 104, a shadow process 106, and advanced queues 108. Note that advances queues contains a s-specific queue 122.

During system operation, shadow process 106 enqueues an event, which the event monitor process 110 then receives through shared memory communication 112. Event monitor process 110 then notifies a client process 116 on a client computer system 114 via a specified protocol and format that the event took place.

Computer system 100 and client computer system 114 can generally include any type of computer system, including, but not limited to, a computer system based on a microprocessor, a mainframe computer, a digital signal processor, a portable computing device, a personal organizer, a device controller, and a computational engine within an appliance. Note that client computer system 114 can alternatively be part of computer system 100.

Database 102 can include any type of system for storing data in nonvolatile storage. This includes, but is not limited to, systems based upon magnetic, optical, and magneto-optical storage devices, as well as storage devices based on flash memory and/or battery-backed up memory.

Client computer system 114 communicates with computer system 100 through a network 120. Network 120 can generally include any type of wire or wireless communication channel capable of coupling together computing nodes. This includes, but is not limited to, a local area network, a wide area network, or a combination of networks. In one embodiment of the present invention, network 120 includes the Internet.

Event Queue

FIG. 2 illustrates the structure of queue 122 within the mechanism for automatic notification in accordance with an embodiment of the present invention. Among other items, queue 122 contains subscription table 202. Within subscription table 202, there are a number of rules 204-208, which contain information specifying rules for performing notifications. Note that subscription table 202 may or may not be a table within database 102.

Subscription Rule

FIG. 3 illustrates a rule 204 within queue 122 in accordance with an embodiment of the present invention. Rule 204 contains an event-type 300 upon which to trigger a notification, a recipient list 302 to whom the notification is to be sent, and a notification format 304. Note that recipient list 302 may include, but is not limited to, pagers, email addresses, fax machines, event logs, and even other queues.

Process of Registering for a Notification

FIG. 4 is a flowchart illustrating the process of creating a registration of a specific event-type as well as a subscription for the notification of the event-type in accordance with an embodiment of the present invention. The system starts by determining the type of event to trigger a notification, and then registering that event-type (step 400). Next, the system adds the subscription rules for the notification (step 402). Note that these subscription rules can specify where the notification is to be delivered. Then, the system registers the protocol by which the notification will be delivered (step 404). Finally, the system registers the presentation format for the notification (step 406).

Process of Sending a Notification

Figure 5:
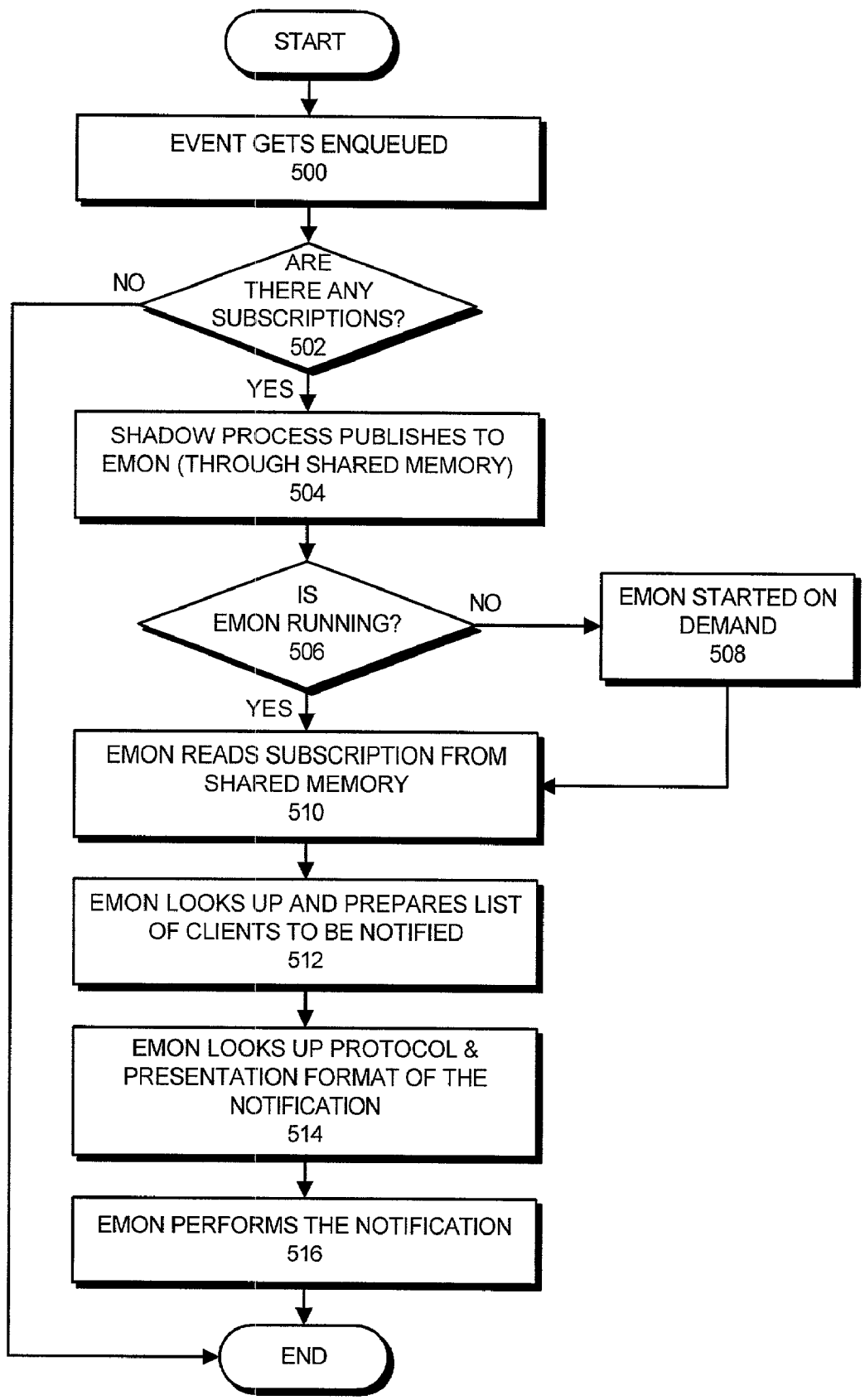
FIG. 5 is a flowchart illustrating the process by which the database receives an event-type, determines if there are any subscriptions for the specified event-type, and if so, sends a notification about the specified event-type in accordance with an embodiment of the present invention.

FIG. 5 is a flowchart illustrating the process by which the database receives an event-type, determines if there are any subscriptions for the specified event-type, and if so, sends a notification about the specified event-type in accordance with an embodiment of the present invention. When an event takes place (step 500), shadow process 106 checks to see if there are any subscriptions for the specified event-type (step 502). If there are no subscriptions, the process is finished for the specified event. If subscriptions do exist, shadow process 106 publishes the specified event information to the event monitor via shared memory communication 112 (step 504). Next, shadow process 106 checks to see if event monitor 110 process is running (step 506), and starts event monitor process 110 if it is not (step 508).

Event monitor 110 then reads the subscription from the shared memory (step 510) and looks up and prepares the list of clients to receive the notification (step 512). Event monitor 110 then looks up the protocol and format of the notification (step 514) and performs the notification (step 516).

Workflow Example

Figure 6:
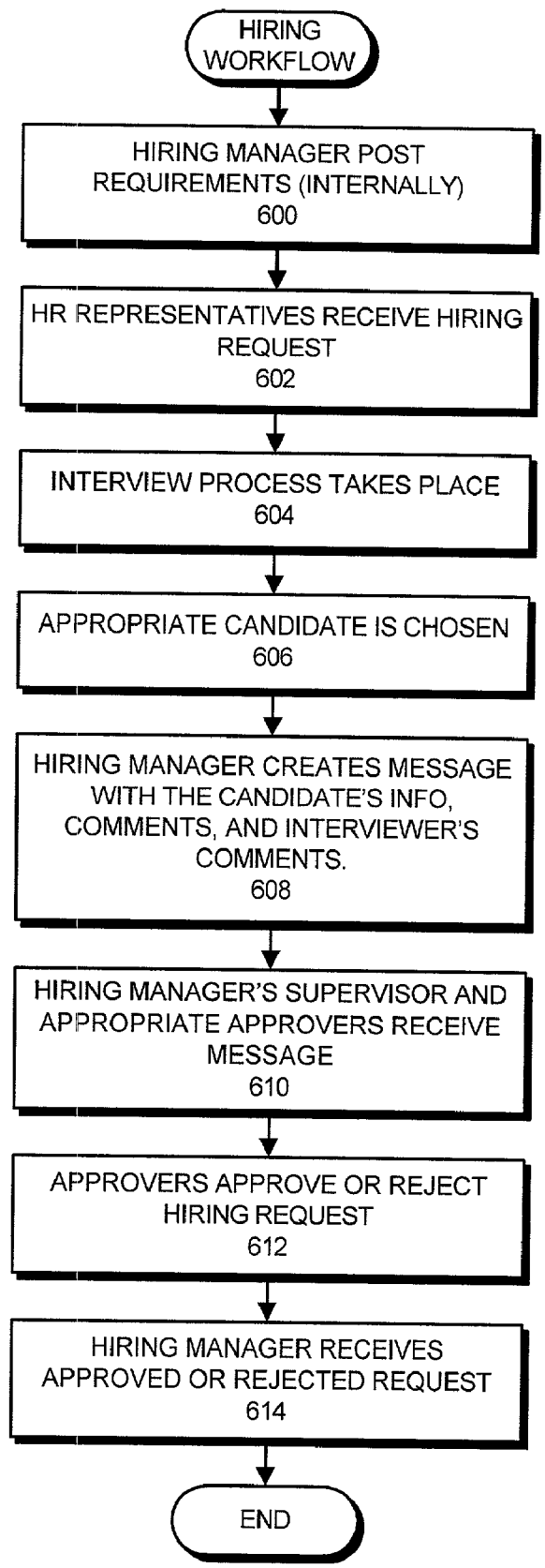
FIG. 6 is a flowchart showing the use of the mechanism for automatic notification of events in a workflow application in accordance with an embodiment of the present invention.

FIG. 6 is a flowchart showing the use of the mechanism for automatic notification of events in a workflow application in accordance with an embodiment of the present invention. In this embodiment, the mechanism for automatic notification of events is a key piece of a hiring workflow system.

In this workflow application, a hiring manager first posts job requirements internally (step 600). Human resources representatives then receive notification from the database that a hiring request has been posted to the database (step 602). Next, an interview process takes place (step 604), and an appropriate candidate is chosen (step 606). The hiring manger then posts a message with the candidate's information, their comments, and the interviewer's comments (step 608).

Next, the hiring manager's supervisor and the appropriate approvers receive notification from the database that their action is required (step 610). Finally, the approvers approve or reject the hiring request (step 612) and the hiring manger receives notification from the database that his or her request has been approved or rejected (step 614).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for configuring a database to automatically send a notification about a database event, comprising:

creating a rule that includes an event-type, a protocol, a notification format, and a list of recipients;

storing the rule in a subscription table;

receiving a first database event at the database;

determining if the first database event is of the event-type;

selecting the rule in the subscription table using the event-type;

using the rule to determine the protocol, the notification format, and the list of recipients; and sending a first notification to the list of recipients using the protocol and the notification format.

2. The method of claim 1, wherein receiving the first database event includes receiving the first database event at a queue.

3. The method of claim 2, wherein the queue is persistent.

4. The method of claim 2, wherein the queue includes records stored in a database table.

5. The method of claim 1, wherein determining by if the first database event is of the event-type is done by an event monitor.

6. The method of claim 1, wherein the first notification is sent to multiple parties.

7. The method of claim 1, wherein the first database event is one of:
a client shutting down;
a database shutting down;
a stack overflowing;
a trigger firing; and
a database error occurring.

8. The method of claim 1, wherein the protocol is one of:
Oracle Call Interface (OCI);
Programming Language/SQL (PL/SQL);
Simple Mail Transfer Protocol (SMTP);
Hyper Text Transfer Protocol (HTTP);
Wireless Application Protocol (WAP); and
Simple Network Management Protocol (SNMP).

9. The method of claim 1, wherein the notification format is one of:
Extensible Markup Language (XML);
Hyper Text Markup Language (HTML);
Wireless Markup Language (WML);
Structured Query Language (SQL); and
raw data.

10. The method of claim 1, wherein the first notification includes:
a command sent to a database to perform an action; and
a command sent to a computer to perform a task.

11. A computer-readable storage medium storing instructions that when executed by a computer cause the computer to perform a method for configuring a database to automatically send a notification about a database event, the method comprising:
creating a rule that includes an event-type, a protocol, a notification format, and a list of recipients;
storing the rule in a subscription table;
receiving a first database event at the database;
determining if the first database event is of the event-type;
selecting the rule in the subscription table using the event-type;
using the rule to determine the protocol, the notification format, and the list of recipients; and
sending a first notification to the list of recipients using the protocol and the notification format.

12. The computer-readable storage medium of claim 11, wherein receiving the first database event includes receiving the first database event at a queue.

13. The computer-readable storage medium of claim 12, wherein the queue is persistent.

14. The computer-readable storage medium of claim 12, wherein the queue includes records stored in a database table.

15. The computer-readable storage medium of claim 11, wherein determining if the first database event is of the event-type is done by an event monitor.

16. The computer-readable storage medium of claim 11, wherein the first notification is sent to multiple parties.

17. The computer-readable storage medium of claim 11, wherein the database event is one of:
a client shutting down;
a database shutting down;
a stack overflowing;
a trigger firing; and
a database error occurring.

18. The computer-readable storage medium of claim 11, wherein the protocol is one of:
Oracle Call Interface (OCI);
Programming Language/SQL (PL/SQL);
Simple Mail Transfer Protocol (SMTP);
Hyper Text Transfer Protocol (HTTP);
Wireless Application Protocol (WAP); and
Simple Network Management Protocol (SNMP).

19. The computer-readable storage medium of claim 11, wherein the notification format is one of:
Extensible Markup Language (XML);
Hyper Text Markup Language (HTML);
Wireless Markup Language (WML);
Structured Query Language (SQL); and
raw data.

20. The computer-readable storage medium of claim 11, wherein the first notification includes:
a command sent to a database to perform an action; and
a command sent to a computer to perform a task.

21. An apparatus for configuring a database to automatically send a notification about a database event, comprising:
a creating mechanism configured to create a rule that includes an event-type, a protocol, a notification format, and a list of recipients;
a storing mechanism configured to store the rule in a subscription table;
a receiving mechanism configured to receive a first database event at the database;
a first determining mechanism configured to determine if the first database event is of the event-type;
a selecting mechanism configured to select the rule in the subscription table using the event-type;
a second determining mechanism configured to use the rule to determine the protocol, the notification format, and the list of recipients; and
a sending mechanism, recipients using the protocol and the notification format.

22. The apparatus of claim 21, wherein the receiving mechanism is configured to receive the first database event at a queue.

23. The apparatus of claim 22, wherein the queue is persistent.

24. The apparatus of claim 22, wherein the queue includes records stored in a database table.

25. The apparatus of claim 21, wherein the first determining mechanism resides within an event monitor.

26. The apparatus of claim 21, wherein the apparatus is configured so that the first notification is sent to multiple parties.

27. The apparatus of claim 21, wherein the first database event is one of:
a client shutting down;
a database shutting down;
a stack overflowing;
a trigger firing; and
a database error occurring.

28. The apparatus of claim 21, wherein the protocol is one of:
Oracle Call Interface (OCI);
Programming Language/SQL (PL/SQL);

Simple Mail Transfer Protocol (SMTP);
Hyper Text Transfer Protocol (HTTP);
Wireless Application Protocol (WAP); and
Simple Network Management Protocol (SNMP).

29. The apparatus of claim 21, wherein the notification format is one of:
Extensible Markup Language (XML);
Hyper Text Markup Language (HTML);
Wireless Markup Language (WML);
Structured Query Language (SQL); and
raw data.

30. The apparatus of claim 21, wherein the first notification includes:
a command sent to a database to perform an action; and
a command sent to a computer to perform a task.

* * * * *

UNITED STATES PATENT AND TRADEMARK OFFICE
CERTIFICATE OF CORRECTION

| | | |
|---|---|---|
| PATENT NO. | : 7,315,863 B2 | Page 1 of 1 |
| APPLICATION NO. | : 09/957736 | |
| DATED | : January 1, 2008 | |
| INVENTOR(S) | : Kambo et al. | |

It is certified that error appears in the above-identified patent and that said Letters Patent is hereby corrected as shown below:

In column 5, line 7, in Claim 5, after "determining" delete "by".

In column 5, line 67, in Claim 17, after "the" insert -- first --.

In column 6, line 43, in Claim 21, after "mechanism" delete "," and insert -- configured to send a first notification to the list of --, therefor.

Signed and Sealed this
Twenty-first Day of June, 2011

David J. Kappos
*Director of the United States Patent and Trademark Office*